Nov. 18, 1958 P. WILLEMS 2,861,232
REMOTE CONTROL SYSTEM FOR POSITIONING OBJECTS
Filed June 27, 1957 2 Sheets-Sheet 1
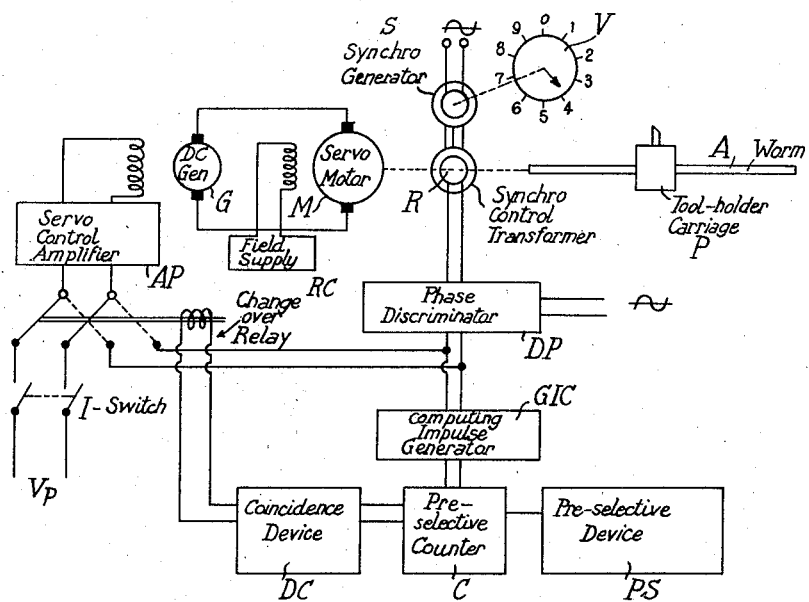
Fig: 1
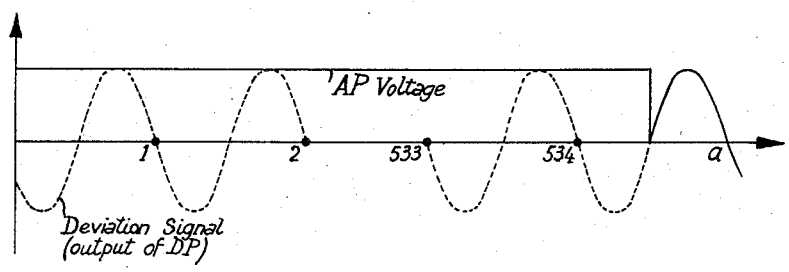
Fig: 2

Nov. 18, 1958
P. WILLEMS
2,861,232
REMOTE CONTROL SYSTEM FOR POSITIONING OBJECTS
Filed June 27, 1957
2 Sheets-Sheet 2
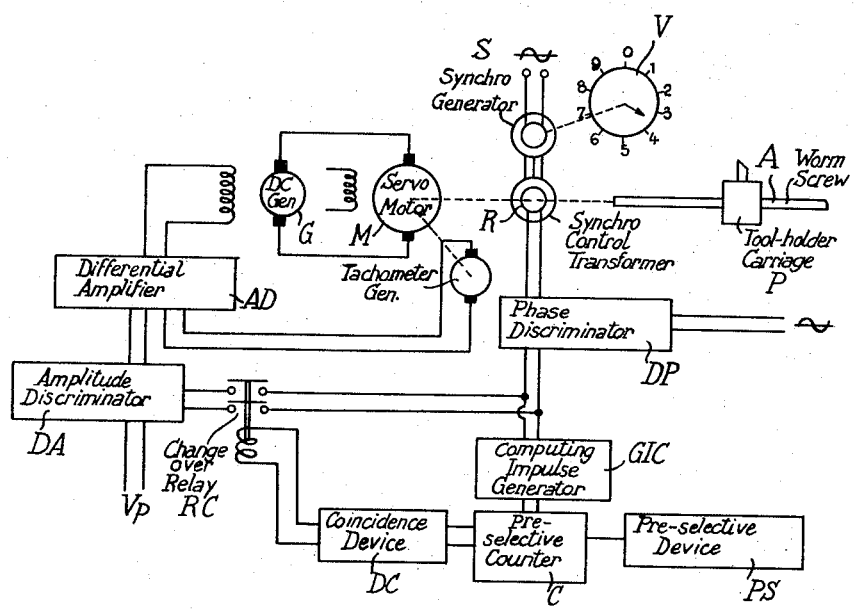
Fig: 3

United States Patent Office 2,861,232
Patented Nov. 18, 1958

2,861,232

REMOTE CONTROL SYSTEM FOR POSITIONING OBJECTS

Paul Willems, Uccle, Belgium, assignor to Ateliers de Constructions Electriques de Charleroi, Brussels, Belgium, a company of Belgium Application June 27, 1957, Serial No. 668,343

Claims priority, application France July 6, 1956

9 Claims. (Cl. 318—28)

This invention relates to remote-control and follow up systems and more particularly to servo systems for positioning an object from a remote position, as for example, a machine tool, rolls in rolling mills, mine cages and the like.

The invention has as a principal object the construction of a servo system for positioning a movable object or element by moving it linerally in two directions of movement.

Another object is to provide a servo system in which the object can be moved at a constant speed or at selected speeds independently of the initial position of the object.

Still another object is to provide a servo system which can provide cumulative positioning in both of said directions of movement.

Another object is to provide a servo system having inherent anti-hunt characteristics and capable of being provided with means for progressively decelerating the controller of the system so as to preclude hunting and oscillations when employed for positioning objects having a large mass and therefore large moments of inertia.

A feature of the invention is that a coarse position of the object is first obtained as a function of a preselected number of revolutions of the motor of a synchro control transformer of a servo loop. The number of revolutions correspond substantially to the distance the object is to be moved from a given position. The system may be provided with vernier means for effecting a fine positioning of the object by controlling the final angular position of the rotor of a synchro control transformer. Accordingly the system accurately positions the object without oscillations and without need of damping devices and their associated loss of power to the system.

Other objects, features and advantages of the invention will be understood from the following description and claims in conjunction with the accompanying drawings which illustrate by way of example preferred embodiments of the system, and in which:

Fig. 1 is a block diagram of a remote-control system in accordance with the invention as applied to machine tool positioning.

Fig. 2 is an explanatory diagram.

Fig. 3 is a block diagram of another embodiment of the remote-control system shown in Fig. 1.

The system has a wide range of applications and is explained as applied to remote control of a machine tool, it being understood that this is but one of the many applications. The system, as shown in Fig. 1, comprises a tool-holder carriage to be positioned by moving it linearly in two directions of movement, as for example, by driving a threaded member or worm screw A. The threaded or positioning member A is driven by a controller comprising a D.-C. servo motor M driving an output shaft mechanically connected to the member A as shown.

The controller includes a D.-C. generator externally excited by a substantially constant voltage $V_p$ which can be selectively impressed on the generator field by closing a switch I energized the generator field through an amplifier AP as shown.

The generator is driven by a constant speed motor (not shown) which may comprise an A.-C. or D.-C. motor. Accordingly the speed of servo motor M is very nearly proportional to the armature voltage if its field flux is maintained constant. The system as delineated has the advantage that the motor speed is controlled by controlling the smaller field power of the generator rather than the armature current of the servo motor M. It will be understood that the controller may comprise an amplidyne or an A.-C. servo motor similarly controllable in speed by error-indicator means. However, a power drive as shown is preferred because of its quick response characteristics.

A synchronous of synchro control transformer R is provided having a stator electrically connected to a synchro generator S and its rotor mechanically connected to the threaded member A or the output shaft so that the angular positions of the rotor and the member A constantly correspond to one another. It will be understood that the term output shaft is used generically and includes known means of connecting a servo loop controller to a movable member for imparting translation or displacement to an object. The synchro generator S is connected through an input shaft to vernier means or fine positioning means V for positioning the input shaft at an input angle corresponding to an angle which is a fraction of a complete revolution of the control transformer rotor. The rotor winding of that control transformer is electrically connected to a phase discriminator or phase sensitive rectifier means DP. It being understood that the control transformer or error-indicator R has an output comprising an error voltage or error signal representative of the difference in angular positions of the input shaft of the synchro generator and the control transformer rotor representative only of the angle of misalignment of the rotor and its stator.

In the phase discriminator DP the alternating error voltage is converted into a rectified deviation signal, variable according to the position of the rotor of the synchronous transformer R with relation to the position in space of its stator field. This deviation signal is positive when the angle between the stator field and the plane of symmetry of the rotor is less than 180° and is negative when this same angle lies between 180° and 360°. The deviation signal is introduced into a counting impulse generator GIC which delivers an impulse to a preselective counter C every time that the deviation signal passes from a positive value to a negative value, or more generally at every revolution of the synchronous or synchro transformer R. The completion of the coarse movement of the tool-holder P, preselected by a device PS, corresponding to a given indication of the counter, is effected by a coincidence device DC which actuates a change-over relay RC. The change-over relay RC disconnects the circuit through which the voltage $V_p$ is impressed on the generator field and closes circuits allowing the deviation signal delivered by the phase discriminator DP to come into action at the end of the positioning movement to impress on the motor M an armature voltage dependent upon said deviation signal which in turn depends on the error signal or error voltage, and thus to determine the deceleration and stopping of the movable element P. It will be understood that input shaft control means V is necessary only for fine positioning of the object or carriage P and in certain applications may be dispensed with.

In order to explain more clearly the operation of the improved remote-control positioning system, it will be assumed that one complete revolution of the synchronous transformer rotor corresponds to a displacement of the carriage P by a distance of 1 millimetre and that the total movement or displacement of the carriage P is 1 metre. The carriage P being at rest, let it be required to effect a displacement of 534.7 mm. The preselection device PS associated with the counter C will determine the displacement of 534 mm., a whole number of revolutions of the transformer rotor R, while the displacement of 0.7 mm. will be produced by controlling the final position of the transformer rotors. In the present case this is done by making the rotor of the synchronous generator S, of which the three stator windings supply the three stator windings of the synchronous transformer R, turn through an angle such that if the rotor of the synchronous transformer R were to turn through a like angle, the carriage P would be displaced by 0.7 mm. In the example considered, the position which it is necessary to give to the rotor of the synchronous generator S will be obtained by positioning the index or pointer of means V fast with the rotor of the generator S at $7/10$ of a revolution from the starting or reference point, or from any other point corresponding to the final position of a preceding displacement, in the case of cumulative positioning.

The preselection device PS will set the counter C at the position 465, this being the complement of 534 with respect to 999.

After these two selection operations have been effected, a switch I may be closed, which will admit the voltage $V_p$ to the amplifier AP, causing the motor M to start up and to reach a running speed which depends on the voltage $V_p$. The synchronous transformer R, being driven by the rotation of the motor M and of the screw A, will furnish an alternating error voltage, which will be discriminated in phase and rectified by the discriminator DP. It will then be introduced in a suitable form into the pulse generator GIC which delivers 534 pulses to the counter C, causing it to take up the position 999. As first impulse has been delivered after the fractional displacement 0.7 another complete revolution of the control transformer R is necessary to obtain the final position. The position 999 is offset by the device DC, which still awaits the next passage through "zero-error" position of the error voltage from the transformer R to actuate the change-over relay RC, whereupon the voltage $V_p$ at the input of the amplifier AP is replaced by the error signal of the synchronous transformer R, which allows the stoppage of the carriage P at the desired position $a$ (Fig. 2) representing a displacement of 534.7 mm. It will be understood that when an input angle has been set on fine positioning means V the motor M will continue to rotate so long as there is a difference in the angular positions of the rotor and the input shaft or index pointer of V. This difference decreases until the error signal becomes zero and the system comes to rest at the "zero-error" position corresponding to the final position selected by means V.

Referring to Fig. 2 in which is shown, in dotted lines, the deviation signal or output voltage of the phase discriminator DP and in lines the input voltage of the amplifier AP. These two voltages are marked as ordinates with the positions of the carriage P as abscissae, and it can be seen that the point $a$ is indeed a point of stable equilibrium. There is likewise indicated in Fig. 2 the points 1, 2, . . . 534, corresponding to points at which the output voltage of the phase discriminator DP passed through the zero-error position and thus denoting where the counting pulses are generated by the pulse generator GIC.

While one embodiment of the invention has been described it will be readily apparent to those skilled in the art that the system can be modified within the scope of the invention. Thus the direction of movement or rotation can be changed by reversing the polarity of the voltage $V_p$, other changes are quite evident, as for example, the control of the fine position, assumed to be the fraction 0.7 mm., by means of the synchronous or synchro generator S may just as well be effected by supplying the three stator windings of the transformer R from a transformer having several windings, as described in the Patent No. 2,783,422 or again by voltages furnished by a calculating machine, or by any other device allowing or giving a specific position to the stator field of the synchro transformer R.

Furthermore, the counter C may be either mechanical or electronic, or any other suitable counting device may be used. The invention likewise makes it possible to count the half-revolutions of the synchronous transformer, the generator GIC generating the counting impulses at every passage of the output voltage of the phase discriminator DP through the zero-error position. In this case, displacements of 534.7 mm. and 535.7 mm. would give rise to diametrically opposed final positions, obtained either by reversal of the feed voltage of the rotor of the synchronous generator S or by reversing the reference voltage of the discriminator DP. The change-over by the relay RC can then take place as soon as the counter has reached the position 999.

Another improvement consists in using the input voltage of the amplifier AP as speed instruction in a control loop. Thus Fig. 3, in which the members similar to the embodiment shown in Fig. 1 are similarly designated, shows such a loop comprising a tachometer dynamo T driven by motor M as shown so that its voltage output is proportional to the speed of the servomotor M, a differential amplifier AD and an amplitude discriminator DA. The voltage output of the tachometer generator is fed to the differential amplifier in parallel with either of the input voltages $V_p$ or $V_a$ so that the speed of the motor M is itself controlled by motor M. The purpose of this discriminator DA, which comes into operation only after the coincidence device DC has allowed the closure of the contacts of the relay RC, is to retain the lower of the two voltages $V_p$ and $V_a$ which feed it and to send the latter to the amplifier AD. The amplitude discriminator DA may also be replaced by any other device which changes over the feed of the amplifier AD from the voltage $V_p$ to the voltage $V_a$ at the moment of the closure of the contacts of the relay RC.

It is possible likewise to initiate the deceleration of the movable element P when the counter has reached another figure other than 999 and to control this deceleration as desired in such a way that it extends over several alternations of the deviation signal. There might for example be used several coincidence devices and their associated counting and preselection circuiting or devices each being intended to diminish the voltage $V_p$ progressively thus ensuring a progressive slow-down. This construction is particularly suitable for applications wherein it is desired to decelerate the object progressively and precludes the servo system from over-riding the "zero-error" position due to the error of the object being moved or positioned and thus eliminates "hunting" and reversing motions or oscillations.

It is naturally permissible to choose at will a suitable number of counters or on the other hand to replace the single synchro control transformer by several control transformers in cascade. Likewise, the fine division on the control transformer may comprise as high a number of positions as desired, so far as is compatible with its sensitivity. It is also permissible to use in these synchro transformers stator and rotor windings in any number.

While preferred embodiments of the invention have been illustrated and described, it will be understood that the invention is in no way limited to these embodiments and that many changes may be made within the spirit and scope of the invention as defined by the following claims.

What I claim and desire to secure by Letters Patent is:

1. An automatic remote-control and follow-up system for positioning an object from a remote position comprising an output shaft for moving and positioning the object, an electrical servo motor connected for driving said output shaft, circuits for selectively impressing a given voltage on said servo motor thereby to move said object at a selected speed, a synchro generator, an input shaft connected to the generator for selecting and controlling the final position of said object, a synchro control transformer electrically connected to the synchro generator and having a rotor driven by said motor thereby having a first output comprising an error voltage representative of an error of angular alignment between the rotor and the input shaft, means connected for maintaining substantially exact correspondence of the angular positions of the output shaft and said rotor, means receptive of said error voltage and having a rectified output the polarity of which reverses when the phase of the control transformer error voltage reverses, whereby said rectified output reverses as a function of complete revolutions of said rotor, automatic means for determining a coarse position of said object as a function of a preselected number of complete revolutions of said rotor and the revolutions corresponding to a selected displacement of said object, means to preselect the number of revolutions, means rendered operative when the preselected number of revolutions obtain and connected for opening said circuits and impressing on said motor a voltage dependent upon said rectified output thereby to decelerate and stop said motor and position said object in a selected position when the angular position of said input shaft corresponds with the angular position of said rotor so that the control transformer has substantially no output.

2. An automatic remote-control and follow-up system for positioning an object from a remote position comprising, an output shaft for moving and positioning the object, an electrical servo motor connected for driving said output shaft, circuits for selectively impressing a given voltage on said servo motor thereby to move said object at a selected speed, a synchro generator, an input shaft connected to the generator for selecting and controlling the final position of said object, a synchro control transformer electrically connected to the synchro generator and having a rotor driven by said motor thereby having a first output comprising an error voltage representative of an error of angular alignment between the rotor and the input shaft, means connected for maintaining substantially exact correspondence of the angular positions of the output shaft and said rotor, phase-sensitive rectifier means receptive of said error voltage and having a rectified output the polarity of which reverses when the phase of the control transformer error voltage reverses, whereby said rectified output reverses as a function of complete revolutions of said rotor, automatic means for determining a coarse position of said object as a function of a preselected number of complete revolutions of said rotor and the revolutions corresponding to a selected displacement of said object, means to preselect the number of revolutions, means rendered operative when the preselected number of revolutions obtain and connected for opening said circuits and impressing on said motor a voltage dependent upon said rectified output thereby to decelerate and stop said motor and position said object in a selected position when the angular position of said input shaft corresponds with the angular position of said rotor so that the control transformer has substantially no output.

3. An automatic remote-control and follow-up system for positioning an object from a remote position comprising, an output shaft for moving and positioning the object, an electrical servo motor connected for driving said output shaft, circuits for selectively impressing a given voltage on said servo motor thereby to move said object at a selected speed, a synchro generator, means for determining a fine position of the object comprising an input shaft connected to the generator for selecting and controlling the final position of said object, a synchro control transformer electrically connected to the synchro generator and having a rotor driven by said motor thereby having a first output comprising an error voltage representative of an error of angular alignment between the rotor and the input shaft, means connected for maintaining substantially exact correspondence of the angular positions of the output shaft and said rotor, phase-sensitive rectifier means receptive of said error voltage and having a rectified output the polarity of which reverses when the phase of the control transformer error voltage reverses whereby said rectified output reverses as a function of complete revolutions of said rotor, automatic means for determining a coarse position of said object as a function of a preselected number of complete revolutions of said rotor and the revolutions corresponding to a selected displacement of said object, means to preselect the number of revolutions, means rendered operative when the preselected number of revolutions obtain and connected for opening said circuits and impressing on said motor a voltage dependent upon said rectified output thereby to decelerate and stop said motor and position said object in a selected position when the angular position of said input shaft corresponds with the angular position of said rotor so that the control transformer has substantially no output, the input shaft having means for selecting input angles having a value less than the angular value of a complete turn of the rotor, whereby the input shaft accurately positions said object.

4. An automatic remote-control and follow-up system for positioning an object from a remote position comprising, an output shaft for moving and positioning the object, an electrical servomotor connected for driving said output shaft, circuits for selectively impressing a given voltage on said servomotor thereby to move said object at a selected speed, the motor having the characteristic of having a speed proportional to the voltage impressed thereon, a synchro generator, an input shaft connected to the generator for selecting and controlling the final position of said object, a synchro control transformer electrically connected to the synchro generator and having a rotor driven by said motor thereby having a first output comprising an error voltage represenative of an error of angular alignment between the rotor and the input shaft, means connected for maintaining substantially exact correspondence of the angular positions of the output shaft and said rotor, means receptive of said error voltage and having a rectified output the polarity of which reverses when the phase of the control transformer error voltage reverses, whereby said rectified output reverses as a function of complete revolutions of said rotor, automatic means for determining a coarse position of said object as a function of a preselected number of complete revolutions of said rotor and the revolutions corresponding to a selected displacement of said object, means to preselect the number of revolutions, means rendered operative when the preselected number of revolutions obtain and connected for opening said circuits and impressing on said motor a voltage dependent upon said rectified output thereby to decelerate and stop said motor and position said object in a selected position when the angular position of said input shaft corresponds with the angular position of said rotor so that the control transformer has substantially no output, and means for selectively varying said given speed at which said motor drives the output shaft thereby to give speed instructions to the motor.

5. An automatic remote-control and follow-up system for positioning an object from a remote position comprising an output shaft for moving and positioning the object, an electrical servomotor connected for driving said output shaft, circuits for selectively impressing a given voltage on said servomotor thereby to move said object at a selected speed, a synchro generator, an input shaft connected to the generator for selecting and controlling the final position of said object, a synchro control transformer electrically connected to the synchro generator and having a rotor driven by said motor thereby having a first output comprising an error voltage representative of an error of angular alignment between the rotor and the input shaft, means connected for maintaining substantially exact correspondence of the angular positions of the output shaft and said rotor, means receptive of said error voltage and having a rectified output the polarity of which reverses when the phase of the control transformer error voltage reverses, whereby said rectified output reverses as a function of complete revolutions of said rotor, automatic means for determining a coarse position of said object as a function of a preselected number of complete revolutions of said rotor and the revolutions corresponding to a selected displacement of said object, means to preselect the number of revolutions, means rendered operative when the preselected number of revolutions obtain and arranged for opening said circuits and impressing on said motor a voltage dependent upon said rectified output thereby to decelerate and stop said motor and position said object in a selected position when the angular position of said input shaft corresponds with the angular position of said rotor so that the control transformer has substantially no output, and means to vary the voltage impressed on said motor thereby to vary its speed.

6. An automatic remote-control and follow-up system for positioning an object from a remote position comprising, an output shaft for moving the object linearly in two opposite directions of movement and positioning said object, an electrical servomotor connected for driving said output shaft, circuits for selectively impressing a given voltage on said servomotor thereby to move said object at a selected speed, a synchro generator, an input shaft connected to the generator for selecting and controlling the final position of said object, a synchro control transformer electrically connected to the synchro generator and having a rotor driven by said motor thereby having a first output comprising an error voltage representative of an error of angular alignment between the rotor and the input shaft, means connected for maintaining substantially exact correspondence of the angular positions of the output shaft and said rotor, phase-sensitive rectifier means receptive of said error voltage and having a rectified output the polarity of which reverses when the phase of the control transformer error voltage reverses, whereby said rectified output reverses as a function of complete revolutions of said rotor, automatic means for determining a coarse position of said object as a function of a preselected number of complete revolutions of said rotor and the revolutions corresponding to a selected displacement of said object, means to preselect the number of revolutions, means receptive of said rectified output and arranged for generating a pulse on each reversal of said rectified output, means connected for counting the impulses thereby indicating the number of rotor revolutions, means for determining when said impulse counting means has counted a number of revolutions corresponding to the number of preselected revolutions, and means rendered operative when the preselected number of revolutions obtain and connected for opening said circuits and impressing on said motor a voltage dependent upon said rectified output thereby to decelerate and stop said motor and position said object in a selected position when the angular position of said input shaft corresponds with the angular position of said rotor so that the control transformer has substantially no output.

7. An automatic remote-control and follow-up system for positioning an object from a remote position comprising, an output shaft for moving and positioning the object, an electrical servo motor connected for driving said output shaft, circuits for selectively impressing a given voltage on said servo motor thereby to move said object at a selected speed, a synchro generator, an input shaft connected to the generator for controlling the final position of said object, a synchro control transformer electrically connected to the synchro generator and being a rotor driven by said motor thereby having a first output comprising an error voltage representative of an error of angular alignment between the rotor and the input shaft, means connected for maintaining substantially exact correspondence of the angular positions of the output shaft and said rotor, means receptive of said error voltage and having a rectified output the polarity of which reverses when the phase of the control transformer error voltage reverses, whereby said rectified output reverses as a function of complete revolutions of said rotor, automatic means for determining a coarse position of said object as a function of a preselected total number of complete revolutions of said rotor and the revolutions corresponding to a selected displacement of said object, means to preselect the number of revolutions, in given sequences, means renderer operative when the preselected number of revolutions obtain in each sequence and connected for opening said circuits and sequentially impressing on said motor a series of voltages dependent upon said rectified output thereby to progressively decelerate and stop said motor when said total revolutions obtain and position said object in a selected position when the angular position of said input shaft corresponds with the angular position of said rotor so that the control transformer has substantially no output.

8. In an electrical servo system for positioning an object from a remote position, an output shaft for positioning said object fine control means comprising an input shaft positionable in selected angular positions with respect to a reference point, the angular position of said input shaft corresponding to the final position of said object, a synchro generator mechanically connected to said input shaft, a controller comprising voltage-responsive dynamical means for driving said output shaft thereby to position said object, circuits for selectively impressing a given voltage on said dynamical means thereby to drive the output shaft at a given speed, a synchro generator mechanically connected to said input shaft, error-indicator means for indicating angular misalignment between the output shaft and the input shaft angular positions and comprising a synchro control transformer electrically connected to said synchro generator and having a rotor mechanically connected to said motor to be driven thereby, means connected for maintaining exact correspondence of the angular positions of said output shaft and said rotor, whereby when driven said control transformer has an error signal representative of an error of angular alignment between the rotor and the input shaft, automatic means for determining a coarse position of said object as a function of a preselected number of complete revolutions of said rotor and the revolutions corresponding to a selected displacement of said object, means to preselect the number of revolutions, means rendered operative when the preselected number of revolutions obtain and connected for opening said circuits and impressing on said voltage responsive dynamical means having the characteristic of operating at a speed substantially proportional to a voltage impressed on it, whereby as said angle of misalignment decreases the dynamical means decelerates and stops when the angular positions of said input shaft and said rotor substantially correspond, and said object is accurately positioned.

9. In an electrical servo system for positioning an object from a remote position, an output shaft for positioning said object, a controller comprising a servo motor for driving said output shaft thereby to position said object, circuits for selectively impressing a given voltage on said servo motor thereby to drive the output shaft at a given speed, error-indicator means comprising a synchro control transformer having a stator field fixed in space and a rotor for indicating angular misalignment between the field and the rotor angular positions and comprising means for generating the field in said synchro generator, means connecting said rotor to said motor so as to be driven thereby, means connected for maintaining exact correspondence of the angular positions of the output shaft and the rotor, whereby when driven said control transformer has an output comprising an error signal representative of an error of angular misalignment between the rotor and the field, means for determining the position of said object as a function of a preselected number of revolutions of said rotor and the revolutions corresponding to a selected displacement of said object, means to preselect the number of revolutions, dynamical means rendered operative when the preselected number of revolutions obtain and arranged for opening said circuits and impressing on said servo motor a voltage dependent upon said error signal, the servo motor having the characteristic of operating at a speed substantially proportional to the voltage impressed on it, whereby as said angle of misalignment decreases the dynamical means decelerates and stops when the angular positions of said field and said rotor substantially correspond so that said object is accurately positioned.

No references cited.